US007248782B2

(12) United States Patent
Kasutani

(10) Patent No.: US 7,248,782 B2
(45) Date of Patent: Jul. 24, 2007

(54) IMAGE RETRIEVING APPARATUS, IMAGE RETRIEVING METHOD AND RECORDING MEDIUM FOR RECORDING PROGRAM TO IMPLEMENT THE IMAGE RETRIEVING METHOD

(75) Inventor: Eiji Kasutani, Tokyo (JP)

(73) Assignee: NEC Corporation, Tokyo (JP)

( * ) Notice: Subject to any disclaimer, the term of this patent is extended or adjusted under 35 U.S.C. 154(b) by 997 days.

(21) Appl. No.: 09/955,142

(22) Filed: Sep. 19, 2001

(65) Prior Publication Data

US 2002/0009286 A1 Jan. 24, 2002

(30) Foreign Application Priority Data

Jun. 10, 2000 (JP) ............................. 2000-307775

(51) Int. Cl.
*H04N 5/91* (2006.01)
*G06F 7/00* (2006.01)
(52) U.S. Cl. .............................. 386/69; 707/1; 382/305
(58) Field of Classification Search .................. 386/46, 386/69, 95; 715/719, 723, 854; 382/305; 707/1, 3, 6
See application file for complete search history.

(56) References Cited

U.S. PATENT DOCUMENTS 5,949,904 A * 9/1999 Delp ........................... 382/165
6,195,497 B1 * 2/2001 Nagasaka et al. ............. 386/46
6,240,423 B1 * 5/2001 Hirata ..................... 707/104.1
6,795,127 B1 * 9/2004 Hori et al. ................... 348/700
6,816,551 B1 * 11/2004 Kasutani ................. 375/240.08
6,983,420 B1 * 1/2006 Itou et al. .................... 715/723

FOREIGN PATENT DOCUMENTS

EP 1 018 688 A2 7/2000

(Continued)

OTHER PUBLICATIONS

N. Dimitrova et al., "Content-based video retrieval by example video clip," Society of Photo-Optical Instrumentation Engineers (SPIE), vol. 3022, Feb. 13, 1997, pp. 59-70.

(Continued)

*Primary Examiner*—Thai Q. Tran
*Assistant Examiner*—Mishawn Dunn
(74) *Attorney, Agent, or Firm*—Foley & Lardner LLP

(57) ABSTRACT

In the similarity calculating portion, a similarity between frame feature vectors of the subject videos for retrieval, stored in the frame feature vector storing portion, and image feature vectors of the query images extracted by the image feature vector extracting portion is calculated, further in the frame feature vector selecting portion, the frame feature vectors of which the similarities are higher than a predetermined threshold value are selected, and furthermore, in the similar segment generating portion, the frame feature vectors that are continuous in time, out of those selected by the frame feature vector selecting portion, are integrated into one group. Thereafter, in the similar image selecting portion, at least one frame feature vector of the highest similarity inside the integrated group is selected so as to present an image having the selected frame feature vector as a result of retrieval.

18 Claims, 3 Drawing Sheets

FOREIGN PATENT DOCUMENTS

| | | |
|---|---|---|
| JP | 5-181905 | 7/1993 |
| JP | 10-207897 A | 8/1998 |
| JP | 11-259061 | 9/1999 |
| JP | 11-316846 | 11/1999 |
| JP | 2000-259832 | 9/2000 |

OTHER PUBLICATIONS

A. Jain et al., "Query by Video Clip," Pattern Recognition, 1998, Proceedings 14th International Conference on Brisbane, Australia, Aug. 16-20, 1998, vol. 1, pp. 909-911.

* cited by examiner

IMAGE RETRIEVING APPARATUS, IMAGE RETRIEVING METHOD AND RECORDING MEDIUM FOR RECORDING PROGRAM TO IMPLEMENT THE IMAGE RETRIEVING METHOD

BACKGROUND OF THE INVENTION

1. Field of the Invention:

The present invention relates to an image retrieving apparatus and an image retrieving method. More particularly, the present invention relates to an apparatus for and a method of retrieving an image similar to a predetermined query image out of videos.

2. Description of the Related Art:

Hitherto, in an image retrieving apparatus having a video data base for storing video data, an image retrieving method is adopted in which image data similar to either a predetermined image (it will be hereinafter referred to as a query image) or a predetermined video segment (it will be hereinafter referred to as a query video segment) is retrieved out of image data stored in the video data base.

In one typical method of such image retrieving method, a query image and all frames of videos are compared and the images are sorted in decreasing order according to their similarities. However, in this image retrieving method, too much images are presented as candidates, and therefore it takes a long time to implement image retrieval.

Thus, in Laid-open Japanese Patent Publication No. 11-259061, a different method has been disclosed in which a change in an image scene usually referred to as a scene-change is preliminarily detected out of the stored videos, and only every one frame immediately after the scene-change are stored as representative frames. Then, retrieval process is implemented to retrieve a similar image only out of the stored representative scenes instead of entire frames involved in video data.

However, the image retrieving method according to the prior art must encounter many problems as described below.

Namely, in the method of proposing image data nominated according to a lower to higher similarity by comparing a query image with all frames of a video, since the video is a set of frames continuing in time, the continuing respective frames, in general, are quite similar to one another in their contents. Thus, the continuous frames involved in a certain shot are eventually nominated and presented, and accordingly the number of nominated and presented images increases, while causing a problem of necessitating a lot of time for completion of retrieval of an image.

In the method disclosed in the Laid-open Japanese Patent Publication No. 11-259061, retrieval of a query image is implemented to retrieve it out of only a part of frames such as frame images obtained by the detection of scene-change, and therefore frames contained within a scene are not retrieved. Thus, retrieval cannot be implemented with every frame unit. At this stage, if a certain scene contains quite a lot of motion activity, there might be a case where the content of the first frame in a scene is greatly different from those of the respective frames within the scene. In this case, a problem might occur in which a desired frame is not included in the representative frames, which are subjected to retrieving process.

On the other hand, from the time of detection of a scene-change, it may be possible to implement further retrieving of a query image out of the respective frames within the scene. Nevertheless, if it fails to detect a scene-change of a scene containing therein a desired image, the desired image cannot be included in the subject of retrieving, and as a result, retrieving of the desired image cannot be eventually implemented.

SUMMARY OF THE INVENTION

Therefore, the present invention was made in view of the afore-mentioned various problems of the prior art.

Namely, an object of the present invention is to provide an image retrieving apparatus for and an image retrieving method of retrieving an image in which the number of similar images nominated and presented is controlled while implementing the retrieving of the similar images by the unit of frame.

Another object of the present invention is to provide a recording medium in which the above-mentioned retrieving method is written.

An image retrieving apparatus according to the present invention, which is an apparatus for retrieving an image similar to a predetermined query image out of subject videos to be retrieved, comprises:

a frame feature vector extracting means for extracting a feature vector of at least a part of frames included in the subject videos for retrieval, and for outputting the extracted one as a frame feature vector; a frame feature vector storing means for storing the frame feature vector outputted by the frame feature vector extracting means;

an image feature vector extracting means for extracting a feature vector of the query image and for outputting the extracted one as an image feature vector;

a similarity calculating means for comparing the frame feature vector stored in the frame feature vector storing means with the image feature vector outputted by the image feature vector extracting means to thereby calculate the similarity of both vectors;

a frame feature vector integrating means for integrating frame feature vectors out of those stored in the frame feature vector storing means that satisfy a predetermined condition on similarity into at least one group; and, a similar image selecting means for selecting at least one frame feature vector of the highest similarity, out of the group integrated by the frame feature vector integrating means, whereby an image having the frame feature vector that is selected by the similar image selecting means is presented as a result of retrieval.

Further, the frame feature vector integrating means is characterized by comprising:

a frame feature vector selecting means for selecting a frame feature vector of a similarity that is calculated by the similarity calculating means and is higher than a predetermined threshold value, out of frame feature vectors stored in the frame feature vector storing means; and a similar segment generating means for integrating frame feature vectors that are continuous in time, out of the frame feature vectors selected by the frame feature vector selecting means into one group and for outputting the integrated group.

Furthermore, an image retrieving apparatus for retrieving a video segment similar to a predetermined query video out of subject videos for retrieval comprises:

a frame feature vector extracting means for extracting a feature vector of at least a part of frames, out of the subject videos for retrieval, and for outputting the extracted one as a frame feature vector;

a frame feature vector storing means for storing the frame feature vector outputted by the frame feature vector extracting means;

a video feature vector extracting means for extracting a feature vector of at least a part of frames included in a query video, and for outputting the extracted one as a first video feature vector;

a video feature vector cutout means for cutting out a frame feature vector corresponding to a time length that the query video inputted by the video feature vector extracting means has, out of the frame feature vectors stored in the frame feature vector storing means, and for outputting the cutout one as a second video feature vector:

a similarity calculating means for comparing the first video feature vector outputted by the video feature vector extracting means with the second video feature vector outputted by the video feature vector cutout means to thereby calculate a similarity of the compared both vectors;

a video feature vector integrating means for integrating the second video feature vectors out of those outputted by the video feature vector cutout means that satisfy a predetermined condition on similarity into at least one group; and a similar image selecting means for selecting at least one of the second video feature vector that has the highest similarity in the group integrated by the video feature vector integrating means, whereby an image having the second video feature vector selected by the similar image selecting means is presented as a result of retrieval.

Further, the video feature vector integrating means is characterized by comprising:

a video feature vector selecting means for selecting a second video feature vector of which a similarity calculated by the similarity calculating means is higher than a predetermined threshold value, out of second video feature vectors outputted by the video feature vector cutout means; and a similar segment generating means for integrating the second video feature vectors that are either continuous in time or partially duplicate, out of those selected by the video feature vector selecting means into one group, and for outputting the integrated group.

Further, the frame feature vector extracting means is characterized in that it generates a resized image for at least a part of frames included in the subject videos for retrieval, and extracts a frame feature vector by applying a frequency conversion and a quantizing processing to the said resized image.

An image retrieving method according to the present invention, which is a method of retrieving an image similar to a predetermined query image out of subject videos for retrieval, is characterized by sequentially implementing:

a process for extracting a frame feature vector of at least a part of frames included in the subject videos for retrieval;

a process for storing the extracted frame feature vector;

a process for extracting an image feature vector of the query image;

a process for comparing the frame feature vector with the said image feature vector to thereby calculate similarity of both feature vectors;

a process for integrating the frame feature vectors of which the similarities satisfy a predetermined condition on similarity into at least one group;

a process for selecting at least one frame feature vector of the highest similarity in the integrated group; and a process for proposing an image having the selected frame feature vector as a result of retrieval.

Further, the integration of the frame feature vectors into the group is characterized in that the frame feature vectors of which the similarities are higher than a predetermined threshold value are selected, and out of the selected frame feature vectors, those that are continuous in time are integrated into one group.

Further, an image retrieving method of retrieving a video segment similar to a predetermined query-video out of subject videos for retrieval is characterized by sequentially implementing:

a process for extracting at least a part of frame feature vectors included in the subject videos for retrieval;

a process for storing extracted frame feature vectors;

a process for extracting a video feature vector of at least a part of frames included in the query video;

a process for cutting out a video feature vector of a frame corresponding to a time length that the query video has, out of the frame feature vectors;

a process for comparing the video feature vector extracted from the query video with the video feature vector cut out from the frame feature vectors to thereby calculate the similarity of both feature vectors;

a process for integrating video feature vectors of which the similarities satisfy a predetermined condition, out of the video feature vectors cut out from the frame feature vectors into at least one group;

a process for selecting at least one video feature vector of the highest similarity in the integrated group; and a process for proposing an image having the selected video feature vector as a result of retrieval.

Furthermore, the integration of the video feature vectors into the group is characterized by implementing the process that the video feature vectors of which the similarities are higher than a predetermined threshold value are selected, and those that are either continuous in time or partly duplicate in the selected video feature vectors are integrated into one group.

Still further, the frame feature vector is characterized in that a resized image is produced for at least a part of frames included in the subject videos for retrieval, and a frequency conversion and a quantizing processing are applied to the resized image.

A recording medium according to the present invention is characterized in that a program permitting a computer to implement the above-mentioned image retrieving method is written in the medium.

In the present invention provided with the above-described constitution and arrangement, when the query image and the subject videos for retrieval that are subjected to a retrieving process are inputted, the feature vector of at least a part of frames included in the inputted subject videos for retrieval is firstly extracted by the frame feature vector extracting means, and the result of extraction is outputted as a frame feature vector so that it is stored in the frame feature vector storing means. Also, in the image feature vector extracting means, a feature vector of an inputted query image is extracted, and is outputted as an image feature vector. The frame feature vector stored in the frame feature vector storing means and the image feature vector outputted by the image feature vector extracting means are inputted in the similarity calculating means whereby the similarity of both vectors are calculated therein. Then, in the frame feature vector selecting means provided in the frame feature vector integrating means, the frame feature vectors of which the similarities calculated by the similarity calculating means are higher than the predetermined value are selected out of the frame feature vectors stored in the frame feature vector storing means, and thereafter in the similar segment generating means provided in the frame feature vector integrating means, the frame feature vectors that are continuous in time, within the frame feature vectors selected by the frame feature vector selecting means, are integrated together into one group and outputted. The frame feature vectors integrated by the frame feature vector integrating means are inputted in the similar image selecting means, and at least one frame feature vector of the highest similarity in the group integrated by the frame feature vector integrating means is selected in the similar image selecting means. Thereafter, the image having the frame feature vector selected by the similar image selecting means is presented as a result of retrieval.

Further, when the query video and the subject videos for retrieval that are inputted, a feature vector of at least a part of frames included in the inputted subject videos for retrieval is firstly extracted in the frame feature vector extracting means, and is outputted as a frame feature vector so as to be stored in the frame feature vector storing means. Also, in the video feature vector extracting means, a feature vector of at least a part of frames included in the inputted query video is extracted, and is outputted as a first video feature vector. Further, in the video feature vector cutout means, the frame feature vector corresponding to a time length that the query video inputted in the video feature vector extracting means has is cut out from the frame feature vectors stored in the frame feature vector storing means, and is outputted as a second video feature vector.

The first video feature vectors outputted by the video feature vector extracting means and the second video feature vectors outputted by the video feature vector cutout means are inputted into the similarity calculating means, so that the similarity of both are calculated in the similarity calculating means. Thereafter, in the video feature vector selecting means provided in the video feature vector integrating means, the second video feature vectors of the similarity that is calculated by the similarity calculating means and is higher than the predetermined threshold value are selected out of the second video feature vectors outputted by the video feature vector cutout means. Further, in the similar segment generating means provided in the video feature vector integrating means, the second video feature vectors that are either continuous or duplicate in time, out of those selected by the video feature vector selecting means are integrated together into one group and are outputted therefrom. The second video feature vectors integrated by the video feature vector integrating means are inputted into the similar image selecting means, and at least one second video feature vector of the highest similarity in the group integrated by the video feature vector integrating means is selected, and thereafter an image having the second video feature vector selected by the similar image selecting means is presented as a result of retrieval. Thus, while the number of the similar images that are nominated and presented is suppressed, the retrieving of a similar image is implemented by the unit of frame.

DETAILED DESCRIPTION OF THE PREFERRED EMBODIMENTS

The preferred embodiments of the present invention will be explained hereinbelow with reference to the drawings.

The First Embodiment

Figure 1:
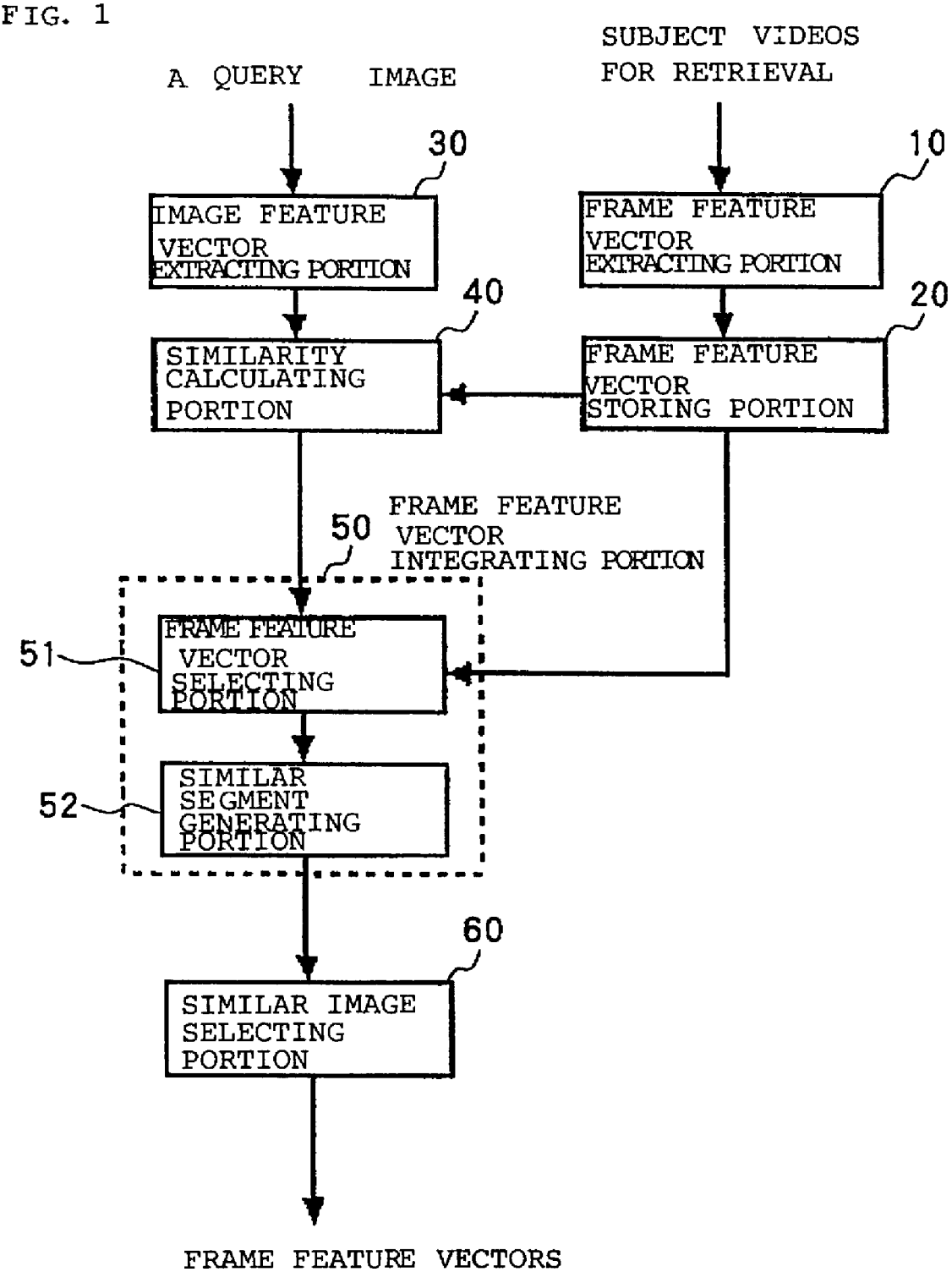
FIG. 1 is a block diagram illustrating an image retrieving apparatus according to a first embodiment of the present invention.

FIG. 1 is a block diagram illustrating an image retrieving apparatus according to a first embodiment of the present invention. As shown in FIG. 1, the present embodiment includes a frame feature vector extracting portion 10 into which subject videos for retrieval are inputted for implementing therein extraction of a feature vector of each of frames included in the inputted subject videos for retrieval and for outputting therefrom the extracted feature vectors as frame feature vectors, a frame feature vector storing portion 20 for storing the frame feature vectors outputted by the frame feature vector extracting portion 10, an image feature vector extracting portion 30 into which a query image is inputted for implementing therein extraction of a feature vectors of the inputted query image and for outputting therefrom the extracted vectors as image feature vectors, a similarity calculating portion 40 for comparing the image feature vectors outputted by the image feature vector extracting portion 30 with the fame feature vectors stored in the frame feature vector storing portion 20 to thereby calculate the similarity of both vectors, a frame feature vector integrating portion 50 for integrating the frame feature vectors of which the similarities calculated by the similarity calculating portion 40 satisfy a predetermined condition, out of the frame feature vectors stored in the frame feature vector storing portion 20, into one or a plurality of groups to output therefrom, and a similar image selecting portion 60 for selecting one or a plurality of frame feature vectors of the highest similarity, out of the groups of frame feature vectors outputted by the frame feature vector integrating portion 50, and for outputting therefrom the selected frame feature vectors. Thus, images having the frame feature vectors outputted by the similar image selecting portion 60 are outputted as a result of retrieval.

The frame feature vector integrating portion 50 includes a frame feature vector selecting portion 51 for selecting the frame feature vectors of which the similarities calculated by the similarity calculating portion 40 are equal to or larger than a predetermined value, within the frame feature vectors stored in the frame feature vector storing portion 20, and a similar segment generating portion 52 for integrating the frame feature vectors that are continuous in time, within those selected by the frame feature vector selecting portion 51, into one group, and for outputting the integrated group as similar segments.

The description of the image retrieving method carried out by the image retrieving apparatus having the above-described constitution and arrangement will be provided hereinbelow.

Referring to FIG. 1, the videos that are subjects for retrieval are inputted into the frame feature vector extracting portion 10, and the query images are inputted into the image feature vector extracting portion 30.

In the frame feature vector extracting portion 10, a feature vector of each of frames included in the inputted subject videos for retrieval is extracted to be outputted therefrom as frame feature vectors. At this stage, the extraction of the frame feature vectors implemented by the frame feature vector extracting portion 10 is not always required to be implemented for all of the frames, and the extraction of the frame feature vectors may be implemented, for example, at a rate of approximately twice per a second.

Now, the detailed explanation of the extracting method of the frame feature vectors implemented by the frame feature vector extracting portion 10 will be provided below.

The extraction of the frame feature vectors in the frame feature vector extracting portion 10 may be accomplished by, for example, the measure disclosed in e.g. Japanese Patent Application No. 11-059432 (it will be hereinafter referred to as a related art) filed previously by the present Applicant. However, as the provision of a detailed description of the art disclosed in this related art will become cumbersome, a brief explanation of that art will be provided hereinbelow based on a concrete example.

Now, when a certain image is inputted, the image is divided into 8×8 (=64) blocks, and then an average value is calculated with respect to each of the blocks to produce an image of a thumbnail picture (namely, a picture of a thumbnail size like an i-con) having 8 pixels×8 pixels. At this stage, ordinarily, since an image is usually a color image consisting of three primary colors of RGB, a thumbnail picture of 8 pixels×8 pixels is produced for each of the three primary colors. However, for example, three pictures corresponding to not RGB but to three kinds of signals consisting of Y (a luminance signal), R-Y and B-Y (color difference signals) are produced.

Subsequently, the DCT (discrete cosine transform) is applied to the thumbnail image to make a frequency conversion so that frequency-expressed information corresponding to the 8×8 pixels is obtained.

Then, a low frequency component is selected from the information corresponding to the 8×8 pixels. For example, 6 components are selected from the Y signal, and 3 components are selected from the respective of the R-Y signal and the B-Y signal, and thus the total of 12 components are selected. Then, these 12 coefficients are roughly quantized to extract information of the total of 64 bits as frame feature vectors. It should here be noted that when the quantization of the coefficients is implemented, quantizing characteristic as well as quantization level numbers are changed, respectively, for every coefficient. As a result of the above-mentioned processing, the information expressed by the low frequency components contained in the image is obtained as frame feature vectors.

The frame feature vectors outputted by the frame feature vector extracting portion 10 are stored in the frame feature vector storing portion 20.

On the other hand, in the image feature vector extracting portion 30, the feature vectors of the inputted query image are extracted to output them as image feature vectors.

In the similarity calculating portion 40, a calculation of similarity of the image feature vectors outputted by the image feature extracting portion 30 and the frame feature vectors stored in the frame feature vector storing portion 20 is implemented. The similarity calculation implemented by the similarity calculating portion 40 is implemented by the unit of frame feature vector to thereby output a similarity for each frame feature vector. Further, it should be understood that this similarity calculation could be effected at an extremely high speed by the method disclosed in the aforementioned related art and so on.

Then, in the frame feature vector selecting portion 51 of the frame feature vector integrating portion 50, only the frame feature vectors of which the similarities calculated by the similarity calculating portion 40 satisfy a predetermined condition are selected out of those stored in the frame feature storing portion 20. At this stage, the above-mentioned predetermined condition based on which the selection of the frame feature vectors is implemented by the frame feature vector selecting portion 51 could be e.g., a condition such that only when the similarity of any frame feature vector calculated by the similarity calculating portion 40 exceeds a predetermined threshold value, such frame feature vector is decided to be selected. Further, the threshold valued could be adaptively changed as required.

Figure 2:
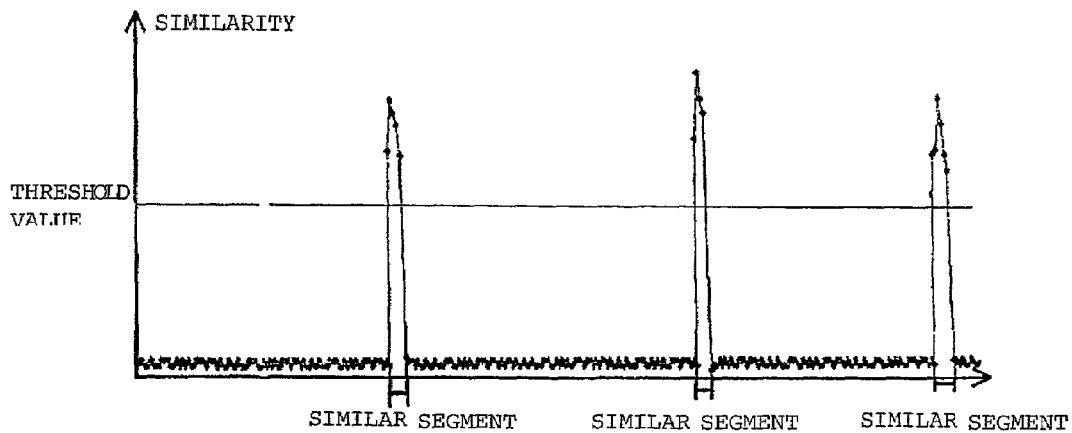
FIG. 2 is a diagrammatic view used for explaining the processing implemented in the similar segment generating portion shown in FIG. 1.

Subsequently, in the similar segment generating portion 52, the frame feature vectors that are continuous in time are integrated together into one group, out of those selected by the frame feature vector selecting portion 51, and are outputted as a similar segment. In this case, a continuously existing segment can be considered as a segment in which the frame feature vectors selected by the frame feature vector selecting portion 51 exist continuously in time, more specifically, the continuously existing segment can be considered as a segment in which between the frame feature vector and the other frame feature vector that were selected by the frame feature vector selecting portion 51, there exists no frame feature vector that was not selected by the frame feature vector selecting portion 51. However, when two or more frame feature vectors do not continue in time, and when only one frame feature vector exists, such one frame feature vector is outputted as a similar segment. FIG. 2 is a diagrammatic view illustrating how the processing is implemented by the similar segment generating portion 52 shown in FIG. 1.

In FIG. 2, the abscissa is the time axis for indicating time positions of the respective frame feature vectors stored in the frame feature vector storing portion 20, and the ordinate is an axis of similarity to indicate the similarities of the respective frame feature vectors calculated by the similarity calculating portion 40.

As illustrated in FIG. 2, in the similar segment generating portion 52, the frame feature vectors within a segment in which these frame feature vectors selected by the frame feature vector selecting portion 51 exist continuously in time, are integrated together into one group, and are outputted as a similar segment.

Thereafter, one or a plurality of frame feature vectors of the highest similarity within the similar segments outputted by the similar segment generating portion 52 are selected by the similar image selecting portion 60, and images having the frame feature vectors selected by the similar image selecting portion 60 are presented as a result of retrieval.

In the above-described embodiment, since all of the frame feature vectors extracted from the subject videos for retrieval are collated with the image feature vectors of the query image, the retrieving of similar images can be implemented by the unit of frame. Furthermore, instead of proposing all similar frames, only the similar frames that exist continuously in time are integrated into one group, and some images of the highest similarity within the respective of the groups are selected for proposal. Therefore, the retrieving of an image can be achieved while controlling or suppressing the number of similar images to be nominated.

Further, it is possible to specify a specific one in the scenes by the unit of frame. Thus, when similar images to the query images are included in a program, even if the similar image does not appear in the introduction of the program, it is possible to accurately obtain a cue in the program.

The Second Embodiment

Figure 3:
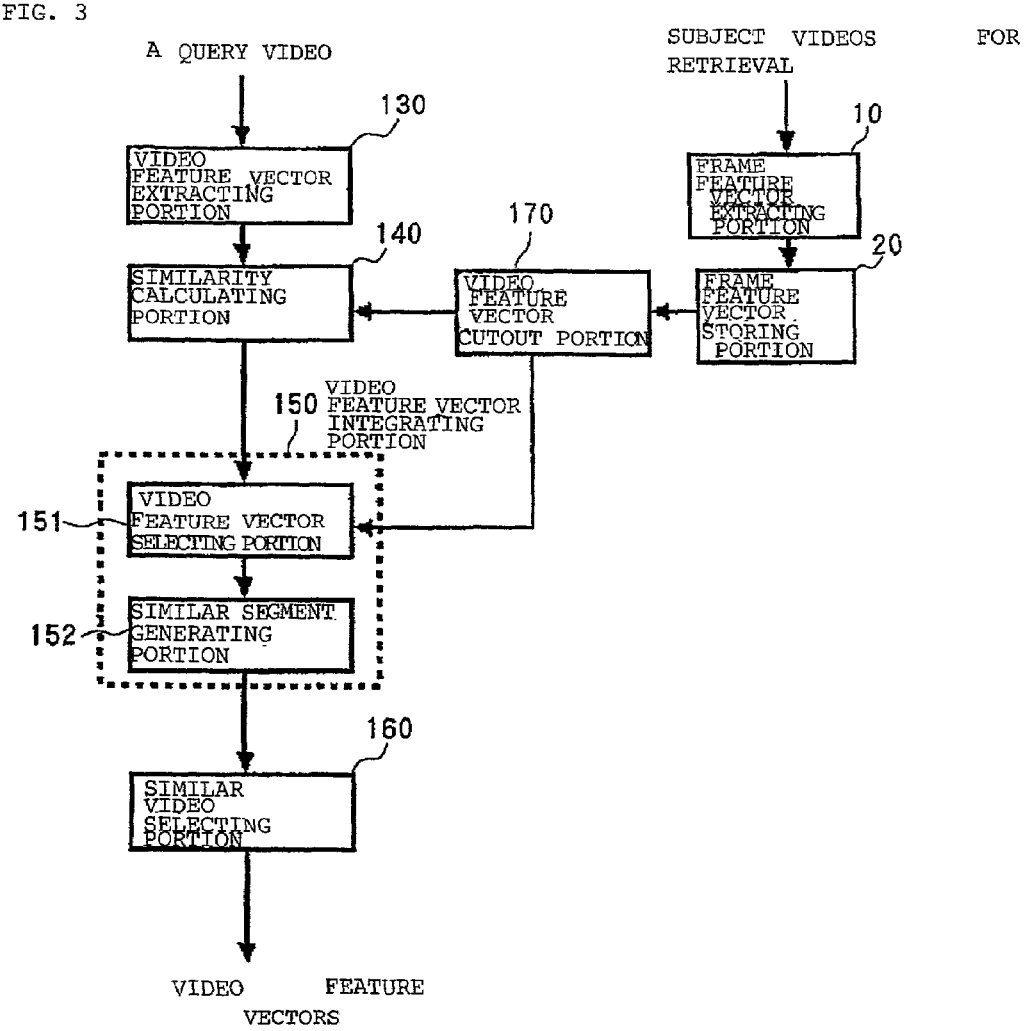
FIG. 3 is a block diagram illustrating an image retrieving apparatus according to a second embodiment of the present invention; and, FIG. 4 is a diagrammatic view used for explaining the processing implemented in the similar segment generating portion shown in FIG. 3.

FIG. 3 is a block diagram illustrating an image retrieving apparatus according to a second embodiment of the present invention.

As illustrated in FIG. 3, the present embodiment includes a frame feature vector extracting portion 10 into which subject videos for retrieval are inputted for implementing therein extraction of a feature vector of each of frames included in the inputted subject videos for retrieval and for outputting therefrom the extracted feature vectors as frame feature vectors, a frame feature vector storing portion 20 for storing the frame feature vectors outputted by the frame feature vector extracting portion 10, a video feature vector extracting portion 130 into which a query video is inputted for implementing therein extraction of a feature vectors of the inputted query video and for outputting therefrom the extracted vectors as video feature vectors, a video feature vector cutout portion 170 for cutting out the feature vectors that may correspond to a time length that the query videos inputted into the video feature vector extracting portion 130 have, out of the frame feature vectors stored in the frame feature vector storing portion 20, and for outputting the cutout frame feature vectors as video feature vectors, a similarity calculating portion 140 for comparing the video feature vectors outputted by the video feature vector extracting portion 130 with the video feature vectors outputted by the video feature vector cutout portion 170 to calculate the similarity of both vectors, a video feature vector integrating portion 150 for integrating the video feature vectors of which the similarities calculated by the similarity calculating portion 140 satisfy a predetermined condition, out of the video feature vectors outputted by the video feature vector cutout portion 170, into one or a plurality of groups to thereby output the integrated groups, and a similar video selecting portion 160 for selecting one or a plurality of video feature vectors of the highest similarity, out of the groups of video feature vectors outputted by the video feature vector integrating portion 150 to thereby output the selected video feature vectors. Thus, videos having the video feature vectors outputted by the similar video selecting portion 160 are outputted as a result of retrieval. Also, the video feature vector integrating portion 150 is constituted by a video feature vector selecting portion 151 for selecting the video feature vectors of which the similarities calculated by the similarity calculating portion 140 are equal to or larger than a predetermined value, out of the video feature vectors outputted by the video feature vector cutout portion 170, and a similar segment generating portion 152 for integrating the video feature vectors that are either continuous or partially duplicate in time, out of those selected by the video feature vector selecting portion 151, into one group to thereby output the integrated group as a similar segment.

The description of the image retrieving method implemented by the image retrieving apparatus having the above-described constitution and arrangement will be provided hereinbelow.

In FIG. 3, the videos that are subjects for retrieval are inputted into the frame feature vector extracting portion 10, and the query videos are inputted into the video feature vector extracting portion 130. The frame feature vector extracting portion 10 extracts the feature vectors of the respective frames included in the inputted subject videos for retrieval to output the extracted feature vectors as frame feature vectors. At this stage, as the method of extracting the frame feature vectors implemented by the frame feature vector extracting portion 10, the method described in connection with the first embodiment could be used.

The frame feature vectors outputted by the frame feature vector extracting portion 10 are stored in the frame feature vector storing portion 20.

In the video feature vector cutout portion 170, the frame feature vectors corresponding to a time length that the query videos inputted into the video feature vector extracting portion 130 have are cut out of the frame feature vectors stored in the frame feature vector storing portion 20, and are outputted as video feature vectors.

In the video feature vector extracting portion 130, the feature vectors of the inputted query videos are extracted and are outputted as video feature vectors.

In the similarity calculating portion 140, the similarity between the video feature vectors outputted by the video feature vector extracting portion 130 and the video feature vectors outputted by the video feature vector cutout portion 170 is calculated. At this stage, the similarity calculation in the similarity calculating portion 140 is implemented in a manner such that a similarity is calculated by the unit of each of the frame feature vectors that are included in the video feature vectors outputted by both the video feature vector extracting portion 130 and the video feature vector cutout portion 170, and then the sum of similarities of the respective frame feature vectors is calculated. Further, this similarity calculation can be achieved at an extremely high speed by the using of the method disclosed in the afore-mentioned related art. Furthermore, the similarity calculated by the similarity calculating portion 140 may be outputted as not only the described sum of similarities for the respective frame feature vectors but also an average value, a median, and a mode.

Thereafter, in the video feature vector selecting portion 151 in the video feature vector integrating portion 150, only the video feature vectors of which the similarities calculated by the similarity calculating portion 140 can satisfy a predetermined condition are selected out of those outputted by the video feature vector cutout portion 170. At this stage, the above-mentioned predetermined condition based on which the video feature vector selecting portion 151 selects the video feature vectors could be a condition such that only the video feature vectors should be selected when the similarities thereof calculated by the similarity calculating portion 140 could exceed a predetermined threshold value. Also, the predetermined threshold value can be adaptively varied as required.

Subsequently, in the similar segment generating portion 152, the video feature vectors that are either continuous or partly duplicate in time, out of those selected by the video feature vector selecting portion 151 are integrated together into one group to be outputted as a similar segment.

Figure 4:
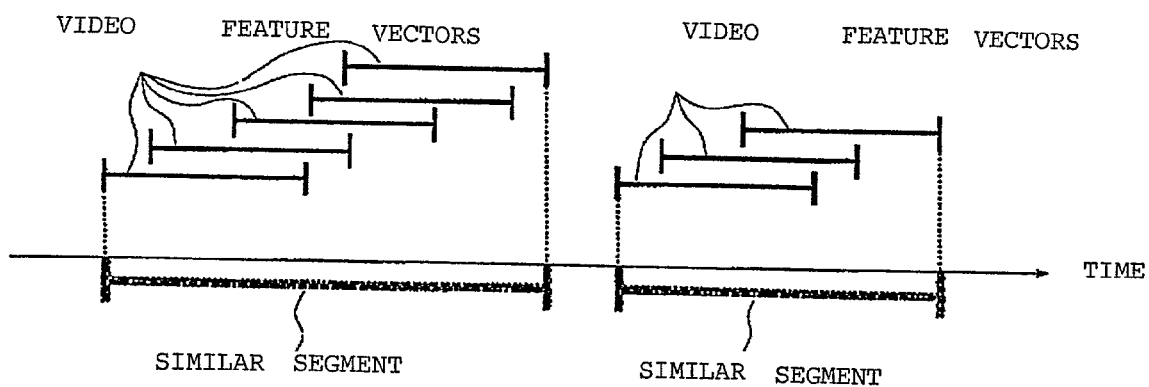

FIG. 4 is a diagrammatic view illustrating the processing implemented by the similar segment generating portion 152 shown in FIG. 3.

As shown in FIG. 4, when the video feature vectors outputted by the video feature vector cutout portion 170 exist continuously, a segment in which the video feature vectors exist continuously are assembled together to generate a similar segment. Then, in the similar video selecting portion 160, one or a plurality of video feature vectors of the highest similarity within the similar segment outputted by the similar segment generating portion 152 are selected. Further, the images that have the video feature vectors selected by the similar video selecting portion 160 are presented as a result of retrieval.

In the above-described embodiment, since all of the frame feature vectors extracted from the videos that are subjects for retrieval are collated with the video feature vectors of the query videos, the retrieving of the similar video segments can be implemented by the unit of frame. Furthermore, instead of proposing all of the similar segments, segments in which the similar video feature vectors exist continuously are integrated into respective one of the groups, and some videos of the highest similarities in the respective groups are selected. Accordingly, the retrieving of the videos can be realized while controlling or suppressing the number of similar videos to be nominated.

Further, in the present embodiment, the opening of a specific program and a common source for the news can be surely retrieved without shifting of the start position. Also, when, for example, a given CM is inputted as a query video, the number of broadcastings and the time zones for broadcastings can be accurately acquainted by the unit of frame. Moreover, if, for example, a highlight scene of a soccer game is inputted as a query video, it is possible to adaptively implement such a retrieval that the same or similar scene is detected from a relay broadcasting of the soccer as a similar video segment. Then, a very similar video although not the same content of video can be obtained.

While the above-described two embodiments are preferred forms of the present invention, the present invention is not intended to be limited thereto, and various changes and modifications will occur to those skilled in the art without departing from the spirit of the present invention.

Further, in the above-described image retrieving method, a program permitting a computer to implement that image retrieving method may be recorded in a recording medium such as an EPROM (an erasable PROM) so as to be widely used.

As described in the foregoing, according to the image retrieving apparatus of the present invention, query images are collated with all of the frame feature vectors extracted from videos that are subjects for retrieval, and therefore the retrieving of the similar images may be implemented by the unit of frame. Also, instead of proposing all of the similar frames as a result of retrieval, segments in which similar frames exist continuously are formed in at least one group, and some images having the highest similarities are selected out of the respective groups in order to retrieve similar images. Accordingly, the retrieving of the images can be realized with the suppressed number of nomination of similar images.

Further, since the query videos are collated with all of the frame feature vectors extracted from the videos that are subjects for retrieval, the retrieving of similar video segments may be implemented by the unit of frame. Furthermore, instead of proposing all similar segments, segments in which similar video feature vectors exist continuously are respectively formed in at least one group, and some most similar videos are selected from the respective segments to retrieve the similar images. Therefore, the retrieving of the videos can be realized with the suppressed number nomination of similar videos.

What is claimed is:

1. An image retrieving apparatus of retrieving an image similar to a predetermined query image out of subject motion videos for retrieval, comprising:
   means for calculating a similarity between a frame image of subject motion videos for retrieval and a query image;
   means for grouping frame images of subject motion videos for retrieval which satisfy a predetermined condition of said similarity; and
   means for extracting an image similar to a query image out of said frame images which are grouped at every group;
   wherein said step of grouping frame images of subject motion videos for retrieval which satisfy a predetermined condition of said similarity is the step of grouping frame images of subject motion videos for retrieval which are continuous with time.

2. The image retrieving apparatus according to claim 1, wherein the extracted image out of said frame images which are grouped is the most similar image to a query image.

3. The image retrieving apparatus according to claim 1, wherein said similarity is calculated through a use of a frame feature vector which is obtained by applying a frequency conversion and a quantizing processing to an image a size of which is reduced.

4. An image retrieving apparatus of retrieving an image similar to a predetermined query image out of subject motion videos for retrieval, comprising:
   means for calculating a similarity between a frame image of subject motion videos for retrieval and a query image;
   means for grouping frame images of subject motion videos for retrieval which satisfy a predetermined condition of said similarity; and
   means for extracting an image similar to a query image out of said frame images which are grouped at every group;
   wherein said query image is a motion video; and
   wherein a similarity between a frame image of said subject motion videos for retrieval and said query image is calculated from a similarity between said subject motion videos for retrieval and said query image at every frame image during a predetermined time length.

5. The image retrieving apparatus according to claim 4, wherein said step of grouping frame images of subject motion videos for retrieval which satisfy a predetermined condition of said similarity is the step of grouping frame images of subject motion videos for retrieval which are either continuous with time or partly duplicate.

6. The image retrieving apparatus according to claim 4, wherein said similarity is calculated through a use of a frame feature vector which is obtained by applying a frequency conversion and a quantizing processing to an image a size of which is reduced.

7. An image retrieving method of retrieving an image similar to a predetermined query image out of subject motion videos for retrieval, comprising the steps of:
   calculating a similarity between a frame image of subject motion videos for retrieval and a query image;
   grouping frame images of subject motion videos for retrieval which satisfy a predetermined condition of said similarity; and
   extracting an image similar to a query image out of said frame images which are grouped at every group;
   wherein said step of grouping frame images of subject motion videos for retrieval which satisfy a predetermined condition of said similarity is the step of grouping frame images of subject motion videos for retrieval which are continuous with time.

8. The image retrieving method according to claim 7, wherein the extracted image out of said frame images which are grouped is the most similar image to a query image.

9. A computer readable medium, on which a program causing a computer to execute the image retrieving method according to claim 8 is stored.

10. The image retrieving method according to claim 7, wherein said similarity is calculated through a use of a frame feature vector which is obtained by applying a frequency conversion and a quantizing processing to an image a size of which is reduced.

11. A computer readable medium, on which a program causing a computer to execute the image retrieving method according to claim 10 is stored.

12. A computer readable medium, on which a program causing a computer to execute the image retrieving method according to claim 1 is stored.

13. An image retrieving method of retrieving an image similar to a predetermined query image out of subject motion videos for retrieval, comprising the steps of:
   calculating a similarity between a frame image of subject motion videos for retrieval and a query image;
   grouping frame images of subject motion videos for retrieval which satisfy a predetermined condition of said similarity; and
   extracting an image similar to a query image out of said frame images which are grouped at every group;
   wherein said query image is a motion video; and
   wherein a similarity between a frame image of said subject motion videos for retrieval and said query image is calculated from a similarity between said subject motion videos for retrieval and said query image at every frame image during a predetermined time length.

14. The image retrieving method according to claim 13, wherein said step of grouping frame images of subject motion videos for retrieval which satisfy a predetermined condition of said similarity is the step of grouping frame images of subject motion videos for retrieval which are either continuous with time or partly duplicate.

15. A computer readable medium, on which a program causing a computer to execute the image retrieving method according to claim 14 is stored.

16. The image retrieving method according to claim 13, wherein said similarity is calculated through a use of a frame feature vector which is obtained by applying a frequency conversion and a quantizing processing to an image a size of which is reduced.

17. A computer readable medium, on which a program causing a computer to execute the image retrieving method according to claim 16 is stored.

18. A computer readable medium, on which a program causing a computer to execute the image retrieving method according to claim 13 is stored.

* * * * *

UNITED STATES PATENT AND TRADEMARK OFFICE
CERTIFICATE OF CORRECTION

PATENT NO. : 7,248,782 B2  Page 1 of 1
APPLICATION NO. : 09/955142
DATED : July 24, 2007
INVENTOR(S) : Eiji Kasutani It is certified that error appears in the above-identified patent and that said Letters Patent is hereby corrected as shown below:

ON THE FRONT OF PATENT:

(30) Foreign Application Priority Data: Delete "June 10, 2000" and replace it with --October 6, 2000--.

Signed and Sealed this

Seventeenth Day of June, 2008

JON W. DUDAS
*Director of the United States Patent and Trademark Office*